United States Patent [19]
Gifford et al.

[11] Patent Number: 5,086,676
[45] Date of Patent: Feb. 11, 1992

[54] METHOD AND APPARATUS FOR MACHINING A DIFFERENTIAL CARRIER

[75] Inventors: David A. Gifford, Roseville; John L. Taylor, Troy, both of Mich.

[73] Assignee: J. P. Tool, Inc., Warren, Mich.

[21] Appl. No.: 551,568

[22] Filed: Jul. 11, 1990

[51] Int. Cl.$^5$ .............................. B23B 1/00; B23B 3/26
[52] U.S. Cl. ........................................ 82/1.11; 82/1.2; 82/131; 408/1 R; 408/158
[58] Field of Search ...................... 82/1.11, 1.2, 131; 408/1 R, 153, 158, 147, 150, 168

[56] References Cited
U.S. PATENT DOCUMENTS

| | | | |
|---|---|---|---|
| 2,247,284 | 6/1941 | Young | 408/148 X |
| 3,884,590 | 5/1975 | Skremtner et al. | 408/158 X |
| 4,066,380 | 1/1978 | Beck et al. | 408/36 X |
| 4,463,490 | 8/1984 | Saito et al. | 29/566.1 |
| 4,982,633 | 1/1991 | Jager | 82/1.2 X |

*Primary Examiner*—Steven C. Bishop
*Attorney, Agent, or Firm*—Basile and Hanlon

[57] ABSTRACT

A machine tool and method for simultaneously boring, facing and back boring three bores in a differential carrier with three tools that rotate coaxially with their spindle axes. Each tool has a first slide at its free end that carries a first cutting insert for back boring a first diameter and then generating a radial face that serves as a bearing seat on the differential carrier. Each tool also has a second slide carrying a second insert for boring a second diameter. The construction, arrangement and movement of the two slides are correlated with each other to maintain the tool in balance during extension and retraction of both slides. In the preferred embodiment the first insert must be retracted when it is advanced into the carrier, extended to back bore and then retracted to generate a radial face. The second insert is at the same location circumferentially of the tool. One insert is retracted while the other insert is extended, and vice versa, to maintain the tool in balance. In this embodiment, the travel of the first slide to back bore and generate is relatively large. hence, for similar slides the movement of the second slide to offset the movement of the first slide is greater than would otherwise be required to bore the second diameter and clear the carrier when the tool is retracted.

17 Claims, 5 Drawing Sheets

METHOD AND APPARATUS FOR MACHINING A DIFFERENTIAL CARRIER

This invention relates to a machine tool and method for performing multiple machining operations, such as boring, facing and back boring, to machine a differential carrier and more particularly to machine tools carrying a plurality of cutting inserts on a tool body that rotates coaxially with a spindle where the inserts are selectively projected and retracted to perform multiple machining operations while maintaining the tool balanced.

BACKGROUND AND SUMMARY OF THE INVENTION

In machining an automotive differential housing or carrier, it is necessary to machine two or more coaxial bores of different diameters with at least one bore having a shoulder at one end so that a shaft can be journaled in the carrier. As set forth in greater detail in U.S. Pat. No. 3,884,590, Skrentner, machining of differential carriers requires very close tolerances, accurate coaxial alignment of the two bores and precise location of bearing faces. This generally requires that the bores be machined while the work remains chucked at the same station and preferably by the same boring tool. Moreover, three shafts are journalled in the differential carrier so that close tolerances must also be met as between three shaft journals.

In the adjustable dual tool boring bar disclosed in the 3,884,590 patent, the boring bar is mounted for rotational adjustment with its axis offset from the axis of the machine spindle. Cutting tools are mounted diametrically opposite on the boring bar. Because the boring bar axis is offset from the spindle axis, rotation of the boring bar on its adjustment axis through 180 degrees reverses the tools, one being retracted inwardly and the other being advanced radially outwardly of the spindle axis. Other types of eccentric quills have also been used to machine differential carriers.

Generating heads, also known as facing heads, can also be used to carry a boring bar and move the boring bar radially, transversely of the spindle axis, to perform the multiple machining operations required for differential carriers. However, during machining the boring bar is still eccentric to the spindle axis. Such facing heads may be of the general type shown in U.S. Pat. No. 4,004,332.

Prior art techniques for machining differential carriers using eccentric tooling operated satisfactorily at relatively low speeds of say 250 to 750 rpm with carriers made of steel or cast iron. However, they cannot be used effectively at higher cutting speeds required for cast aluminum housings, for example, 1,000 to 4,000 rpm. With prior art eccentric tools, it is difficult, if not impossible, to maintain the tool balanced and hence maintain close tolerances and accuracies required for precise machining of the differential carrier. The larger internal diameter of the back bore further contributes to the difficulties in maintaining the tool balanced. The tool must have a diameter small enough to allow it to be inserted through the bore with sufficient clearance to allow it to be moved radially to its eccentric position for the back boring operation. With tools extending any substantial distance from the spindle bearings, commonly referred to as overhang, any unbalance in the tooling is further accentuated at the unsupported end of the tool. Even with generating heads where the overhang of the head has been minimized, for example, of the type disclosed in U.S. Pat. No. 4,004,332, the overhang of the generating head and the boring bar contribute further to unbalance and wobble at high cutting speeds.

There is a need for and the objects of this invention are to provide a machine tool and method to perform multiple machining operations such as boring, facing and back boring at high machining speeds; that are particularly suited for machining a differential carrier and the like; that can operate effectively at high cutting speeds required for machining cast aluminum; that are easily adapted to machining bores of different diameters; that effectively utilize a single insert to machine a bore and also face a shoulder at the end of the bore, and that can effectively bore different diameters, all in a single machining cycle.

According to the preferred embodiment of the present invention, these needs and objects are met with three tools that rotate coaxially with their spindle axes. Each tool has a first slide at its free end that carries a first cutting insert for back boring a first diameter and then generating a radial face that serves as a bearing seat on the differential carrier. Each tool also has a second slide carrying a second insert for boring a second diameter. The construction, arrangement and movement of the two slides are correlated with each other to maintain the tool in balance during extension and retraction of both slides. In the preferred embodiment the first insert must be retracted when it is advanced into the carrier, extended to back bore and then retracted to generate a radial face. The second insert is at the same location circumferentially of the tool. One insert is retracted while the other insert is extended, and vice versa, to maintain the tool in balance. In this embodiment, the travel of the first slide to back bore and generate is relatively large. Hence, for similar slides, the movement of the second slide to offset the movement of the first slide is greater than would otherwise be required to bore the second diameter and clear the part when the tool is retracted.

These and other objects and advantages of the invention will be readily understood by one acquainted with the design and use of boring spindles from the following specification and the accompanying drawings.

DETAILED DESCRIPTION OF THE PREFERRED EMBODIMENTS

Figure 1:
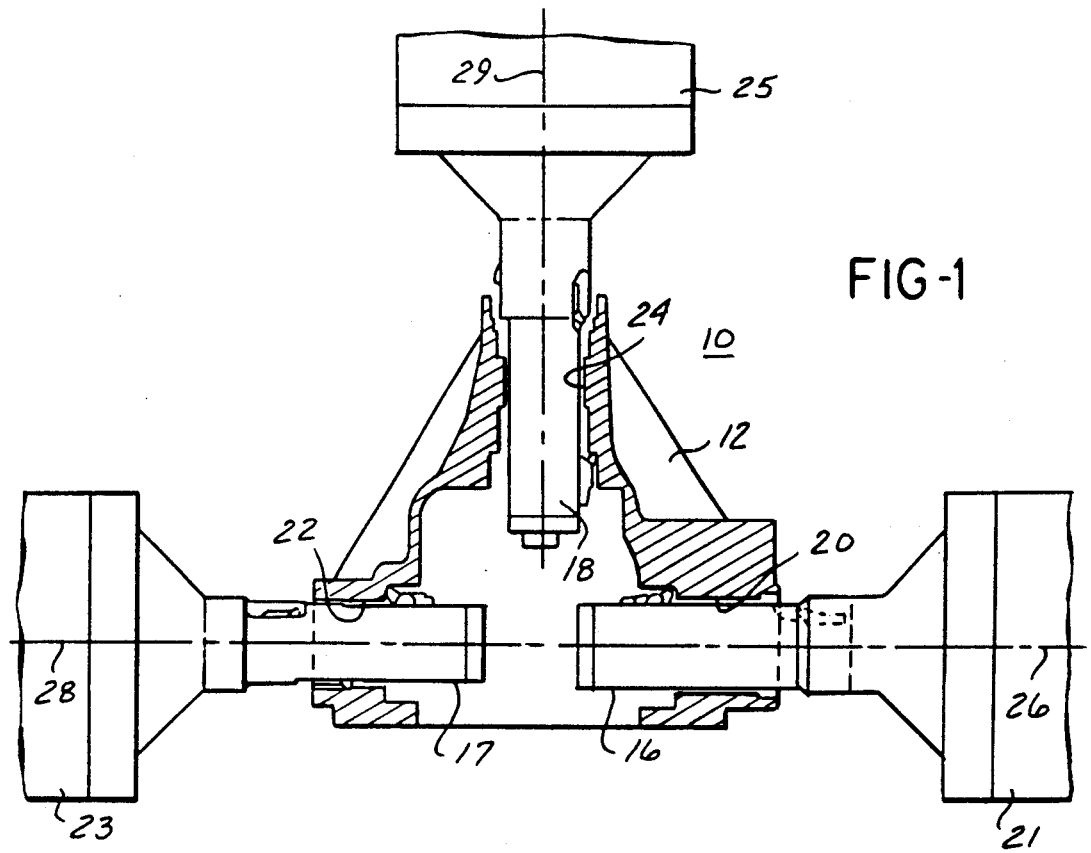
FIG. 1 diagrammatically illustrates a work station for machining three bores in a differential carrier using three tools constructed according to the present invention.

In FIG. 1 there is diagrammatically illustrated a work station 10 for machining a differential carrier 12 using three tools 16, 17 and 18 to simultaneously machine bores 20, 22 and 24 in carrier 12. Bores 20, 22 are for differential case bearings and bore 24 is for the bearings and a seal for a pinion shaft. The centerline pinion bore is designated as 19 is FIG. 5. Each of the tools are driven by conventional machine tool spindles 21, 23 and 25 that rotate the tools concentrically about respective spindle axes 26, 28 and 29 and also infeed and back feed the tools longitudinally on the spindle axis. For the differential carrier being described, axes 26 and 28 are coaxial, at ninety degrees to and offset from an axis 29. Station 10 may be a rough machining station. Tools 16, 17 and 18 are shown in FIG. 1 at the end of a back boring operation and at the beginning of a facing operation. Each of the tools 16, 17 and 18 have common features according to the present invention that overcome the disadvantages of the prior art. Tools having the same construction as tool 16, 17 and 18 can be used at a subsequent work station to finish machine bores 20, 22 and 24 by merely replacing cutting tool cartridges having roughing inserts with cartridges having finishing inserts. The present invention is particularly well suited to machine a carrier 12 made of cast aluminum which requires relatively high rotational speeds of tools 16, 17 and 18. Since all of the tools of 16, 17 and 18 have common features, the present invention can best be understood by describing the construction and operation of tool 17 in detail from which the construction and operation of tools 16 and 18 will be more readily understood.

Figure 5:
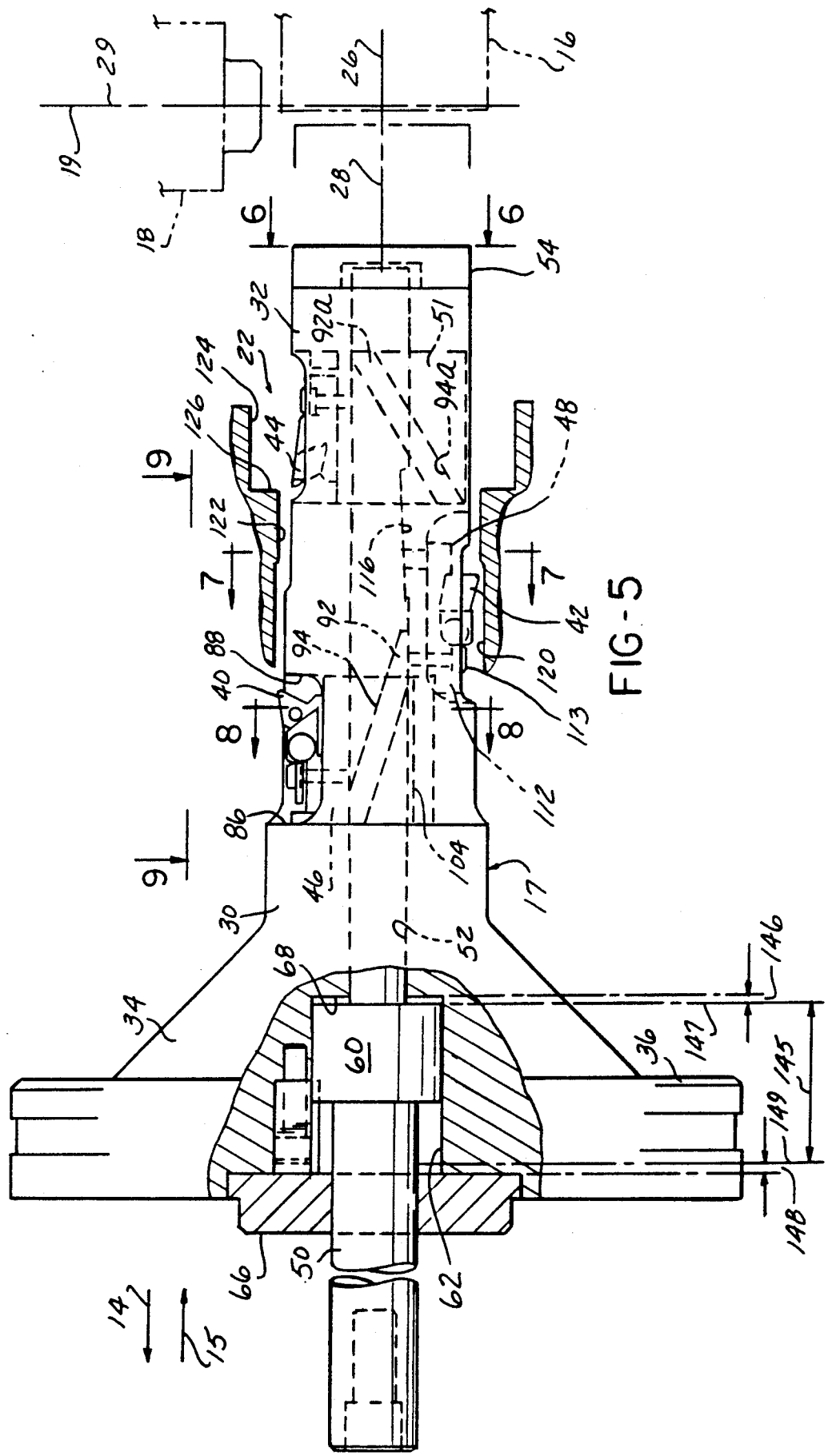
FIG. 5 is an elevational view, partly broken away and in section of one of the tools of the present invention with one segment rotated ninety degrees out of position to simplify the drawings.

Referring to FIGS. 5-9, tool 17 is illustrated in FIG. 5 as positioned after machining and just before retraction from bore 22. Tool 17 comprises a generally cylindrical body 30, one end 32 being a free end, the right end as viewed in FIG. 5, and the other end having a enlarged conical base 34 and an integral flange 36 which is bolted directly on a spindle 23 of a machine tool. The spindle rotates body 30 coaxially with the spindle axis 28 and is also arranged to shift tool 17 axially of the spindle axis 28 in a conventional manner. Tool 17 carries three cutting tool inserts 40, 42 and 44 mounted respectively on a slide 46, a flexible cartridge 48 and a slide 51 that move transversely of axis 28 to project and retract cutting tool inserts 40, 42, 44. Flexible cartridge 48 and slides 46 and 51 are actuated by a draw bar 50 carried in a bore 52 that extends through body 30. Bore 52 is closed at the free end of 32 by an end cap 54. Draw bar 50 extends outwardly of tool 17 at the other end for connection to actuating means (not shown) in the spindle. Draw bar 50 has an enlarged integral boss 60 at the left end as viewed in FIG. 5, mounted in an enlarged bore 62 in body 30. Boss 60 is keyed at 64 for co-rotation with body 30 and maximum axial shifting relative to body 30 between a retainer plate 66 and a shoulder 68 that joins bores 52, 62.

Figure 9:
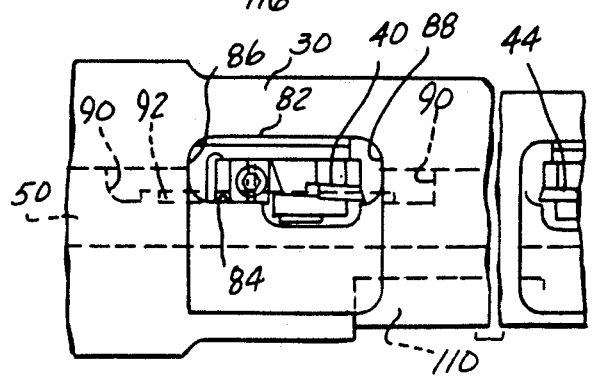
FIG. 9 is a fragmentary top view on line 9—9 of FIG. 5.

Slide 46 is slidably carried in a way 80 that extends transverse to axis 28 through body 30. Slide 46 is slidably retained in way 80 by parallel spaced-apart faces 82, 84 and retained against axial shifting by end faces 86, 88 (FIG. 5). Draw bar 50 is formed with a recess 90 that receives slide 46 and has a radially outwardly projecting key 92 that rides in a keyway 94. As best seen in FIG. 5, key 92 and keyway 94 are inclined in a first direction, upwardly from right to left as viewed in FIG. 5, so that axial shifting of draw bar 50 (retraction as shown at arrow 14 and extension as shown at arrow 15) relative to body 30 moves slide 46 transversely of axis 28 to project and retract insert 40. For example, when draw bar 50 is pushed to the right as shown in FIG. 5, slide 46 is moved upwardly to project insert 40 and slide 51 is retracted. As shown in FIG. 9, recess 90 and keyway 92 extend axially of draw bar 50 to allow limited shifting thereof to achieve the desired transverse motion of slide 46.

Figure 8:
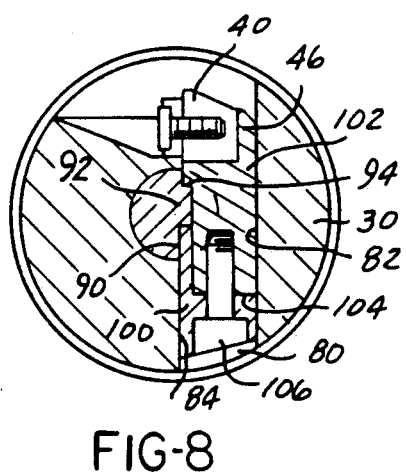
FIG. 8 is a sectional view taken on line 8—8 of FIG. 5.

Slide 46 comprises two slide block segments 100, 102 abutting at an interface 104 and fastened together by screws 106 so as to allow assembly and disassembly of slide 46 in way 80. With this two piece construction, one of the opposed faces of keyway 94, the top face as viewed in FIG. 8, is on slide segment 102 and the opposed keyway face, the lower face as viewed in FIG. 8, is on segment 100. Interface 104 extends axially of tool 17. Wear at key 92 and keyway 94 can be compensated by removing slide 46 from body 30 and machining the interface 104 at either segment 100 or 102. Insert 40 is mounted on the outer end of slide 46 using conventional means and preferably is in a replaceable cartridge. Body 30 is cut away as illustrated in FIG. 5 to facilitate changing the cartridge without removing slide 46 from body 30.

Based on the detailed description of slide 46, the arrangement and construction of slide 51 carrying insert 44 will be readily apparent with one important difference. Slides 46 and 51 have the same orientation in body 30 to project and retract inserts 40, 44 at the same location circumferentially of body 30. However, a key 92a on draw bar 50 and a keyway 94a on slide 51 are inclined upwardly from left to right as viewed in FIG. 5, in a direction opposite to that of key 92 and keyway 94 of slide 46, so that axial shifting of draw bar 50 moves slide 51 transversely to axis 28 in a direction opposite to that of slide 46. Hence, when one of the inserts 40, 44 is extended, the other is retracted and vice versa. As will be explained in greater detail in connection with a machine cycle, slides 46 and 51 and hence inserts 40, 44 are spaced axially of body 30 to perform boring, facing and backboring operations while body 30 rotates coaxially on spindle axis 28. Inserts 40, 44 are selectively extended and retracted at the same location circumferentially of body 30 to maintain tool 17 in balance at high rpms.

Figure 6:
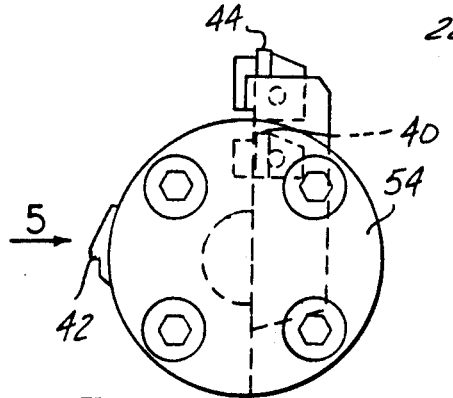
FIG. 6 is a right end view of the tool of FIG. 5 with cutting inserts properly oriented and as positioned in FIG. 11.
Figure 7:
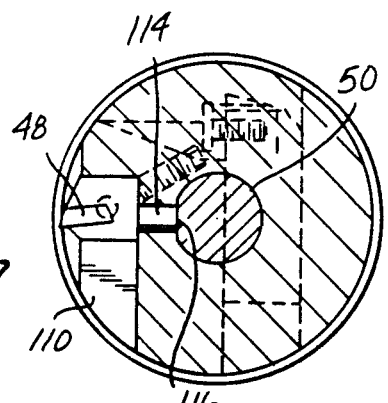
FIG. 7 is a sectional view taken on line 7—7 of FIG. 5.

The versatility of the present invention, as applied to tool 17 for example, allows for additional machining by insert 42 which is mounted in a flexible cartridge 48. Cartridge 48 is carried in pocket 110 in body 30 and is mounted at its heel 112 to body 30 by screw 113. A pin 114 on the free end of cartridge 48 engages an inclined cam surface 116 on draw bar 50 to flex cartridge 48 transversely of axis 28 and retract and extend insert 42. For the particular machining to be described, insert 42 does not have to move radially any significant distance and hence does not significantly affect the balance of tool 17. Consequently, the location of insert 42 circumferentially of body 30 is not critical from a balancing standpoint and is shown in FIGS. 6 and 7 as being at ninety degrees from inserts 40, 44. As noted earlier, in FIG. 5 insert 42 has been rotated from its true position to simplify the drawings. Generally, the circumferential location of insert 42 is selected to maintain the structural strength of body 30.

The design of particular electrical and hydraulic circuits for the machine controls to advance and retract tool 17 as well as actuate draw bar 50 may vary widely. Since the design and arrangement of such controls are well known in the art of machine tools, even though they are not shown or specifically described herein, they will be apparent by reference to the machine cycle.

Figure 10:
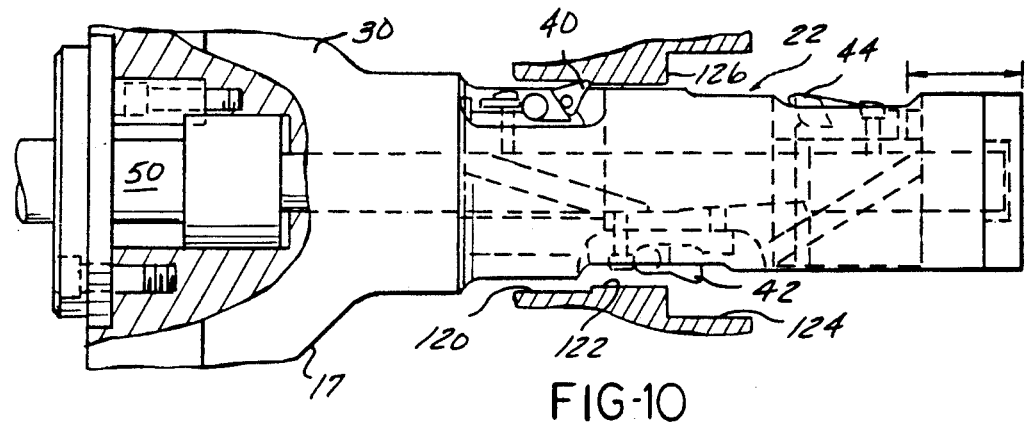
FIGS. 10, 11 and 12 are elevational views of the tool shown in FIG. 5 to illustrate the machining cycle.
Figure 11:
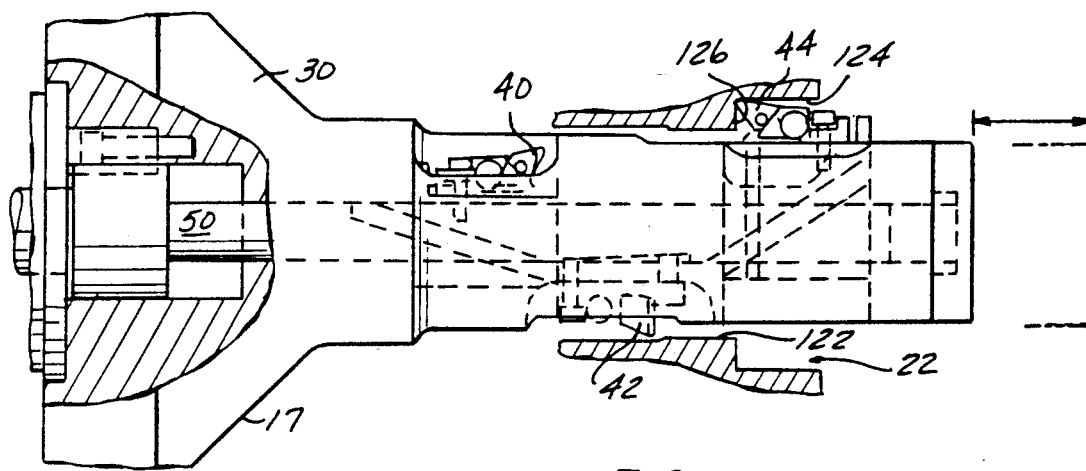
Figure 12:
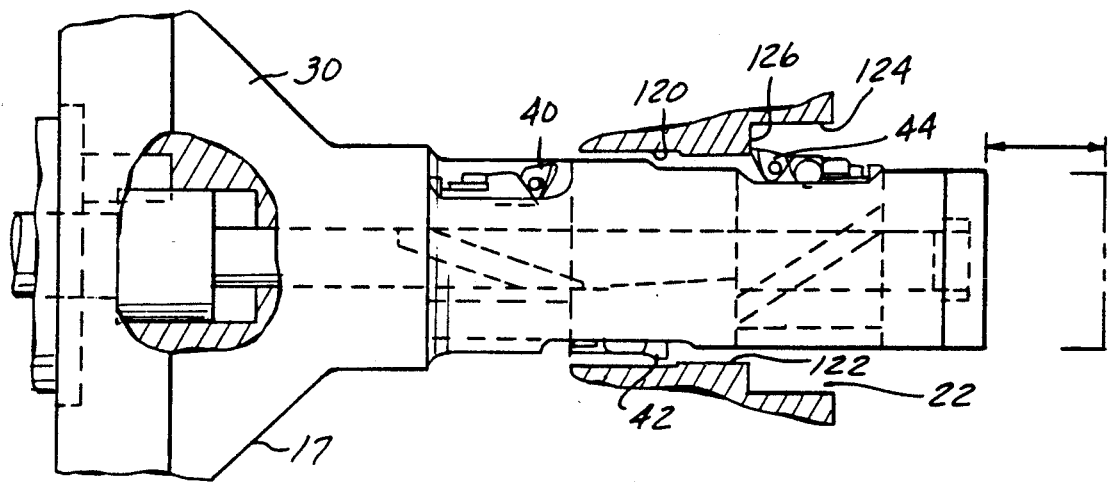

The machining operation performed by tool 17 can best be understood by referring to FIGS. 1, 2B, 4, 5 and 10 through 12. Generally, bore 22 has one bore diameter 120 that is bored by insert 40, a second bore diameter 122 bored by insert 42, a third diameter 124 bored by insert 44 and a radial shoulder 126 that serves as a bearing seat and is also generated by insert 44. At the beginning of the cycle the machine tool slide is fully retracted, in a direction to the left from the position shown in FIGS. 1 and 5, so that tool 17 is completely outside carrier 12 and in position to machine bore 22. Draw bar 50 is pushed to its extended position in body 30, in a direction to the right as viewed in FIG. 5, so that inserts 40, 42 are radially extended and insert 44 is retracted corresponding to the insert positions illustrated in FIG. 5. The beginning of the cycle is designated as point 130 on the cycle timing diagram 2B. With the spindle and tool 17 rotating coaxially, tool 17 is advanced rapidly (rapid advance 132, FIG. 2B cycle diagram) to insert tool 17 through bore 22. With insert 44 retracted, tool 17 clears the smallest diameter of rough bore 22. Tool 17 is then fed inward (feed 134), in a direction to the right (FIGS. 1 and 5), to bore diameter 122 with insert 42 while insert 40 bores diameter 120 until the inserts are in the position shown in FIG. 10. Draw bar 50 is then retracted in body 30 (retract 138), pulled in a direction to the left (FIG. 11), to project insert 44 and retract inserts 40, 42 while tool 17 is axially stationary. As shown in FIG. 10, insert 44 clears the inner end of bore 22 so that when it is extended, it is now in a position to back bore diameter 124. The spindle slide is then back fed (back feed 140) to move tool 17 from right to left as viewed in FIG. 11 to back bore diameter 124. At the completion of back boring diameter 124, tool 17 is in the position illustrated in FIG. 11, and after a slight dwell, draw bar 50 is extended in body 30, pushed from left to right as viewed in FIG. 11, in a controlled manner, while tool 17 remains in the same axial position to generate radial face 126 (generate 142) until the tool is generally positioned as shown in FIG. 12. As shown in FIGS. 11 and 12, while insert 44 is retracted to generate face 126, inserts 40, 42 are being extended in positions axially of bore 22 so as to clear the diameters 120, 122 that were previously bored. At the end of the facing operation, draw bar 50 is further extended in tool 17 to fully retract insert 44 and fully extend inserts 40, 42 to the position shown in FIG. 5. Spindle 23 is rapidly returned by the machine tool slide (rapid return 144) to rapidly retract tool 17 out of carrier 12 and return to the start position 130.

Tool 17 offers several advantages in performing multiple machining operations of the type described, e.g., boring, facing and back boring as is and will later be even more apparent after considering tools 16 and 18. Because tool 17 rotates coaxially and inserts 40, 42, 44 concentrically with spindle axis 28, tool 17 can be balanced for operation at high rpms. By way of example, tools constructed according to the present invention have been operated at 1800 rpm for machining aluminum differential carriers. Such high speed machining has not been achieved with eccentric tooling. Because tool 17 rotates coaxially with the spindle on axis 28, body 30 can have a relatively large diameter with minimum clearance in bore 22. Consequently, sufficient strength and rigidity can be built into the tool to operate effectively with a large overhang from the spindle bearings. In contrast, with eccentric tooling the diameter of the tool must be small relative to tool 17 to provide sufficient clearance between the eccentric tool and the bore so that the tool can be inserted through the bore and then moved to its eccentric machining position as with a generating head. A larger mass can be provided with a larger diameter tool, as contrasted to a small diameter eccentric tool, and hence, the tool is more readily kept in balance at high rpm.

According to one important aspect of the present invention, the construction of tool 17 provides flexibility in locating the cutting inserts so that tool 17 remains in balance as inserts are retracted and extended Where relatively large radial travel is required and/or relatively large machining forces are involved, relatively sturdy insert slides, such as slides 46 and 51 are used. Slides 46 and 51 provide sufficient travel of the inserts 40, 44 as required for machining bore 22. To minimize excessive unbalance during the machining cycle, the radial location of the slides and the circumferential location of the inserts is selected so that the imbalance of projecting one insert is offset by retracting another insert in substantially the same circumferential location. With tool 17, as described and best illustrated by comparing FIGS. 6 and 8, slides 46 and 51 are oriented to move in opposite radial directions so when one of the inserts 40, 44 is projected, the other insert is retracted at substantially the same location circumferentially of body 30. Hence, unbalance introduced by projecting insert 40 is offset by retracting insert 44 and vice versa.

More specifically, the travel of slide 51 must be such that when insert 44 is retracted, it clears the smallest diameter, and when insert 44 is extended, it is positioned to back bore diameter 124. However, the arrangement and travel of slide 46 is selected to offset unbalance that would be introduced by extension and retraction of slide 51. Stated differently, the travel of slide 51 is much greater than required for insert 40 to just bore diameter 120 and then be only slightly retracted to clear the part during other machining operations and rapid retraction of tool 17 at the end of the machining operations. Slides 46 and 51 are of similar construction and hence of similar size, configuration, mass and center of gravity. Consequently, tool 17 is maintained in balance by moving slides 46, 51 transversely in unison in opposite directions. Where the inserts at the same location circumferentially as described, one slide is retracted while the other slide is extended and vice versa.

The arrangement of the inserts at the same circumferential location was selected and is preferred for an efficient machine cycle, as described, for machining differential carrier 12. This arrangement also achieved a relatively small overhang and provided sufficient clearance at the inner ends of tools 16, 17 and 18, as shown in broken lines at the right of FIG. 5, when the three bores 20, 22 and 24 are machined simultaneously. However, for other bore geometries or applications other than differential carriers, it might be possible to use other slide geometries, e.g., inserts at diametrically opposite locations extended in unison or even using two slides to offset one slide. Of course, the axial feed travel lengths and the axial location of the inserts must be correlated to the axial dimensions of the bore diameters so that each insert clears the part when that insert is not machining, regardless of being extended or retracted due to the position of the other insert required for its machining operation. For example, in FIG. 5, the axial spacing of inserts 40, 44 is greater than the combined axial dimension of diameters 120 and 122 which is also greater than the combined axial dimension of diameters 122 and 124. By way of further example, with one differential carrier the back bored diameter 124 was nominally 2.9 inches and the smallest diameter 122 was 2.02 inches. Slide 51 had a radial travel 0.48 inches. The diameter of body 17 at slide 46 was 1.9 inches resulting in a radial clearance of about 0.050 inches with diameter 122 with tool 17 positioned as shown in FIG. 10.

The construction of tool 17 with inserts at the same circumferential location also facilitates automatic compensation for uneven wear at tools 40, 42, 44 under the control of automatic gaging or by manual gaging of a previously machined part. The initial tool and control set up may provide for an initial draw bar travel indicated at 145 (FIG. 5). As insert 40 wears, the extended location of insert 40 can be reset by a short compensating stroke which resets the right travel limit 147 to the right as viewed in FIG. 5 within a total compensating range 146. As insert 44 wears, the extended location of insert 44 can be reset by a short compensating stroke, which resets the left travel limit 149 to the left as viewed in FIG. 11 within a compensating range 148. Because inserts 40, 44 are at the same location circumferentially of body 30, both inserts can be reset independently to compensate for wear by independently setting the travel limits 147, 149 at each end of the stroke of draw bar 50.

Ideally, with identical slides one might expect that the slides must move the same distance to ideally offset each other. However, some compromise may be required to meet other requirements. In the differential carrier described, diameter 120 had a very tight tolerance. To meet this tolerance and provide effective wear compensation, key 92 and keyway 94 were set at an angle less than the angle on key 92a and keyway 94a so that the extended position of insert 40 could be set more precisely. Although this results in a lesser travel for slide 46, as compared to slide 51, the travel of slide 46 was still sufficient to offset the travel of slide 51 to keep tool 17 in balance. In this regard, final balancing of tool 17 can be done using conventional balancing techniques for a first condition when insert 40 is extended and a second condition when insert 44 is extended. It will be understood that when tool 17 is described herein as "balanced" or maintained "in balance", it is not necessarily at a true or totally balanced condition. Rather it is in a balanced condition that is sufficient for the relatively strong rigid body 30 to withstand unbalance tendencies and effectively and precisely machine the part at higher rpms.

Figure 2C:
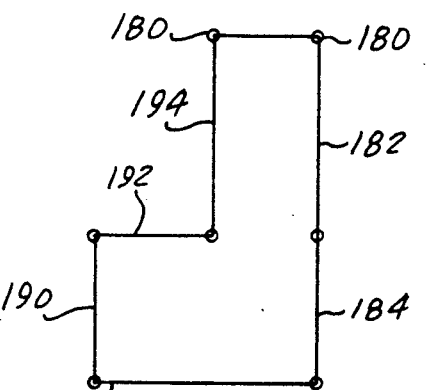
FIGS. 2A, 2B and 2C show cycle diagrams useful in understanding the machining cycles for the three tools of FIG. 1.
Figure 2B:
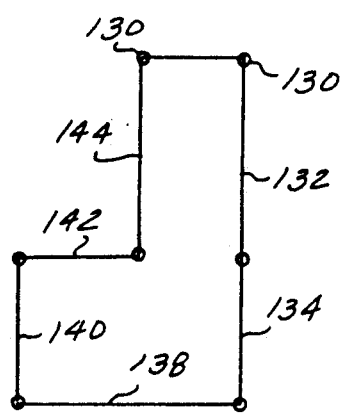
Figure 14:
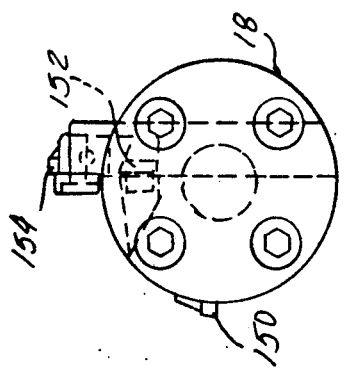
FIG. 14 is a right end view of the tool of FIG. 13.
Figure 13:
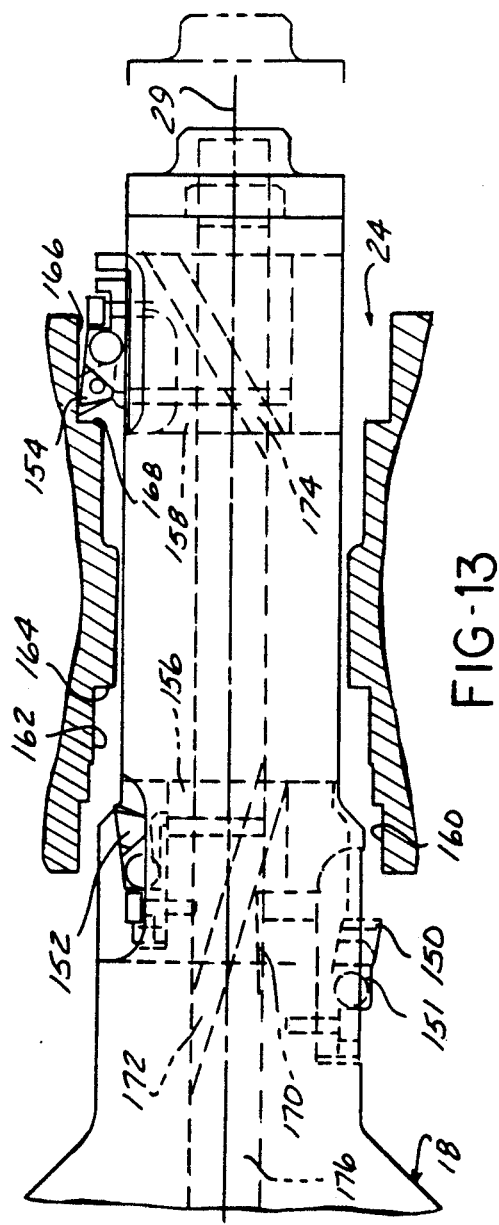
FIG. 13 is an elevational view showing a modification of the tool of FIG. 5 for machining a second bore in the differential carrier.

Based on the detailed description of the construction and operation of tool 17, the construction and operation of tool 18 will be readily understood by reference to FIGS. 1, 13 and 14. In FIG. 13, tool 18 is shown near the end of a back boring operation. Tool 18 generally comprises a first insert 150 in a flexible cartridge 151 and inserts 152, 154 on respective transverse slides 156, 158. In general, cartridge 151 is constructed similarly to cartridge 48 (FIG. 5), slide 156 is constructed similarly to slide 46 and slide 158 is constructed similarly to slide 51. Cartridge 151 and slides 156, 158 are located circumferentially and axially of tool 18 so that insert 150 bores a diameter 160, insert 152 bores a diameter 162 and generates a radial face 164 and insert 154 back bores a diameter 166 and generates a radial face 168. Again for convenience, the circumferential location of insert 150 is shown in FIG. 13 rotated ninety degrees from its true circumferential location, whereas the true circumferential location of the inserts are as shown in FIG. 14. Again, inserts 152, 154 are at the same circumferential location. Inserts 150, 152 and 154 are extended and retracted, respectively, by a cam surface 170 and a pair of keys 172, 174 on draw bar 176. Tool 18 is shown in FIG. 13 near the end of a back boring operation on diameter 166. The multiple machining operations performed by tool 18 can be better understood by reference to the cycle diagram in FIG. 2C.

At the start of the machining cycle (point 180 in FIG. 2C), tool 18 is fully retracted from carrier 12, moved to the left from the position shown in FIG. 13, and draw bar 176 is fully extended in tool 18, pushed in a direction toward the right from the position shown in FIG. 13. Inserts 150, 152 are fully extended and insert 154 is fully retracted in a manner similar to that shown in FIG. 5 for inserts 40, 42 and 44. Tool 18 is first rapidly advanced (rapid advance 182), in a direction to the right as viewed in FIG. 13, to extend tool 18 through bore 24 with insert 154 being retracted to clear the smallest diameter of bore 24. Continued infeeding of tool 18, that tool bores diameters 160, 162 with inserts 150, 152 (feed 184). At the end of the boring operation, tool 18 remains axially stationary and draw bar 176 is retracted in tool 18, pulled toward the left, in a controlled manner to feed insert 152 radially inwardly and generate face 164 (generate 188). At the end of the boring operation, insert 154 is located inside carrier 12 to clear bore 24 when insert 154 is moved to its extended position as draw bar 176 is pulled in tool 18. When tool 18 is located to back bore diameter 166, inserts 150, 152 have been retracted sufficiently to clear diameters 160, 162 during back boring to prevent scoring. Tool 18 is then back fed to back bore diameter 166 (backfeed 190) with the inserts located in the positions shown in FIG. 13 until insert 154 reaches face 168, at which point tool 18 remains actually stationary while draw bar 176 is extended, pushed in a direction toward the right to move insert 154 radially inwardly in a controlled manner to generate face 168 (generate 192). When inserts 150, 152 are extended while insert 154 is retracted during generation of surface 168, inserts 150, 152 are now located axially to clear the previously bored diameters 160, 162. After face 168 is generated, further extension of draw bar 176 to its right travel limit fully retracts insert 154 so that tool 18 may now be rapidly returned (rapid return 194), toward the left from its position shown in FIG. 13, to complete the machining cycle.

Figure 15:
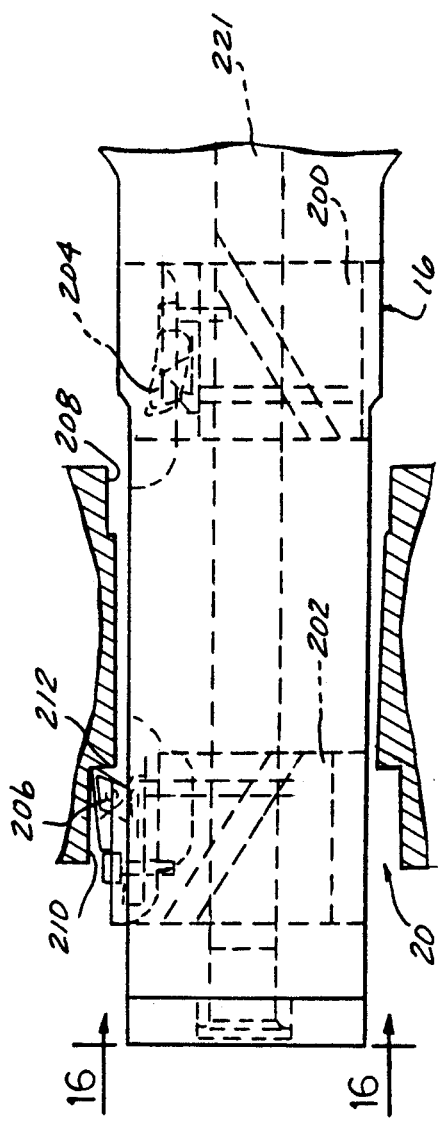
FIG. 15 is an elevational view of a still further modification of the tool of FIG. 5 for machining a third bore in the differential carrier.
Figure 16:
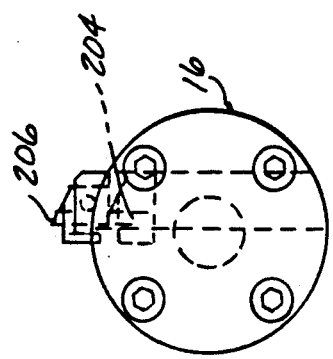
FIG. 16 is a left end view of the tool of FIG. 15.

Referring to FIGS. 1, 15 and 16, tool 16 carries two transverse slides 200, 202 on which inserts 204, 206 are mounted. The construction of slide 202 corresponds to that of slide 51 (FIG. 5) and slide 200 corresponds to slide 46. In general, insert 204 bores a diameter 208 and insert 206 back bores a diameter 210 and generates a radial face 212.

Figure 2A:
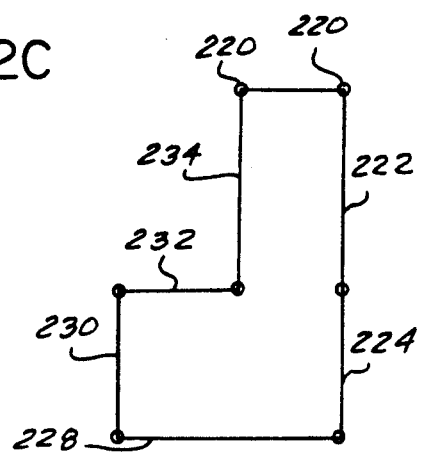
Figure 3:
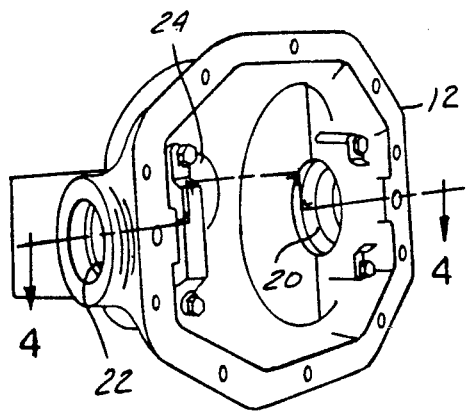
FIG. 3 is a perspective view of the differential carrier shown in FIG. 1.
Figure 4:
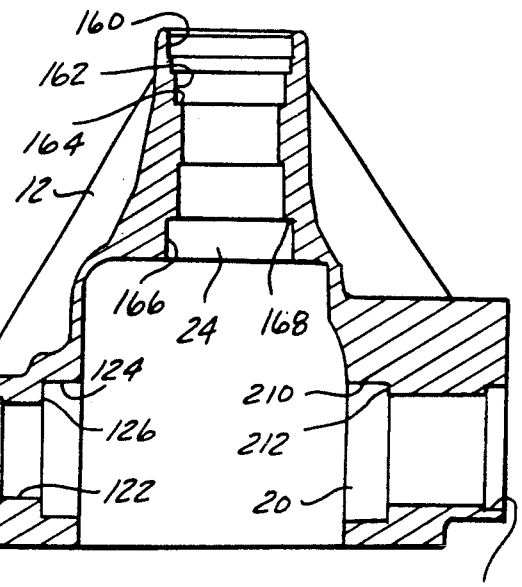
FIG. 4 is a sectional view of the differential carrier taken on line 4—4 in FIG. 3.

At the start of a machining operation (point 220, FIG. 2A), tool 16 is fully retracted from carrier, moved in a direction to the right from the position shown in FIGS. 1 and 15. Draw bar 221 is pushed to its left travel limit so that insert 206 is fully retracted and insert 204 is fully extended. With insert 206 fully retracted, tool 16 can be rapidly advanced (rapid advance 222) to extend tool 16 through bore 20 with the retracted insert 206 clearing the smallest diameter of bore 20. With continued infeeding of tool 16, insert 204 bores diameter 208 (feed 224). When the boring operation is completed, tool 16 remains axially stationary and insert 204 is retracted while insert 206 is extended by draw bar 221 (stroke 228) so that insert 206 is in a position to bore diameter 210. Tool 16 is then backfed (back feed 230), in a direction toward the right as viewed in FIG. 15, to bore diameter 210. When insert 206 is axially positioned to generate face 212 as shown in FIG. 15, tool 16 remains axially stationary and draw bar 221 is pushed in a controlled manner to generate face 212 (generate 232). Insert 206 is then fully retracted and simultaneously, insert 204 is extended at a location to clear diameter 208 so that tool 16 can be rapidly returned (rapid return 234) to complete the machining operation.

From the foregoing description of tools 16, 17 and 18, the features and advantages of the present invention to simultaneously machine bores 20, 22 and 24 of differential carrier 12 (FIG. 1) will now be more fully understood and appreciated. It will be apparent from the cycle diagrams in FIGS. 2A, 2B and 2C that the feed times and rates can be correlated to provide an effective machining cycle for each tool individually and all three tools machining simultaneously. Each of the tools, individually, has the advantages described in detail in connection with tool 17 to operate effectively at high speeds, which substantially enhances the overall effectiveness when simultaneously machining three bores of a differential carrier. The present invention is especially suited for high speeds required for aluminum differential carriers. However, with these higher speeds having been achieved, the present invention would also be useful to machine differential carriers made of steel and cast iron to reduce the machine cycle time. Similarly, although the present invention is especially suited for simultaneously machining three bores on a differential carrier where each bore requires a back bore and generating a radial face, the present invention is also potentially useful for other boring, facing and back boring applications. Further advantages can be seen because tools 16, 17 and 18 have many common features and indeed, interchangeable parts.

Although a specific construction and operation of tools 16, 17 and 18 has been described herein for purposes of illustration, it will be understood that they are not intended to indicate the limits of the present invention, the scope of which is defined in the following claims.

We claim:

1. A machine tool for machining a differential carrier having three bores each of which requires a back boring operation having a first diameter and a radial face generated at an inner end of the back bore, said machine tool comprising, first, second and third tool means adapted to be mounted on a respective spindle for rotation coaxially with a rotational axis of its spindle and axially shiftable of its spindle axis to machine a respective bore, each of said tool means comprising a tool body extending in a direction along its spindle axis, first and second slide means spaced axially along said body and carried on body transverse to its spindle axis, said first slide means being adapted to carry an insert to back bore said first diameter and generate said radial face on said carrier, said second slide means being adapted to carry another insert to bore a second diameter, said first slide being located on said body to extend and retract said first insert at a first predetermined location circumferential of said body, said second slide being located on said body to extend and retract said second insert at a second predetermined location circumferential of said body, and actuating means carried on said body and operatively interengaged with said first slide means and said second slide means to extend and retract said first insert at said first circumferential location and extend and project said second insert at said second location, and wherein said first and second slide means are arranged on said body and constructed so that movement of one of said slides that would cause unbalance of said body is offset by movement of the other slide to maintain said tool in balance.

2. The machine tool set forth in claim 1 wherein said first and said second circumferential locations are substantially the same circumferential location and wherein said actuating means is interengaged with said first and second slide means to extend one of said inserts and substantially simultaneously retract the other insert.

3. The machine tool set forth in claim 2 wherein said actuating means comprises a draw bar shiftable axially of said body between first and second travel limits, said draw bar being integrated with said first slide means to radially extend said first insert when said draw bar is at said first travel limit and interengaged with said second slide means to extend said second insert when said draw bar is at its second travel limit.

4. The machine tool set forth in claim 3 further comprising means to compensate for wear of one of said inserts by varying one of said travel limits and wear of the other of said inserts by varying the other travel limit.

5. The machine tool set forth in claim 3 wherein at least one of said tool means has a third insert carrying means carried on said body for movement transverse to its spindle axis and wherein said draw bar is operatively engaged with said third insert carrying means to move said third insert carrying means between radially extended and retracted positions.

6. The machine tool set forth in claim 1 wherein said first slide means has a first travel distance to extend its insert to back bore said first diameter and wherein said first travel distance is greater than a maximum clearance between said tool body and its bore.

7. In a machine tool of the type adapted to perform multiple machining operations such as boring, facing and back boring of a differential carrier and the like, tool means adapted to be mounted on a spindle for rotation coaxially with a rotational axis of said spindle and shiftable axially along said axis, said tool means comprising a body extending in a direction along said axis, first slide means carried on said body for movement transverse to said axis for carrying a first cutting tool to extend and retract said first cutting tool radially of said body at a first location circumferentially of said body, second slide means carried on said body for movement transverse to said axis for carrying a second cutting tool to extend and retract said second cutting radially of said body at a second location circumferentially of said body, said second slide being spaced axially of said body from said first slide, and actuating means operatively interengaged with said first and said second slide means for moving said first and said second slides to extend and retract said cutting tools, said first and said second circumferential locations and movement of said slides by said actuating means being correlated to each other so that movement of one slide that would unbalance said body is offset by movement of the other slide to maintain said body in balance.

8. The machine tool set forth in claim 7 wherein said first and said second slides extend said first and said second cutting tools at the same location circumferentially of said body and wherein said actuating means is interengaged with said first and said second slide to extend one of said cutting tools while substantially simultaneously retracting the other cutting tool at substantially the same location circumferentially of said body to thereby maintain said tool means in balance while it is rotating and said slide means are moved transverse to said axis.

9. The machine tool set forth in claim 8 wherein said body has an axial bore therein, said actuating means comprises a draw bar movable in said bore coaxially with said rotational axis and axially shiftable therealong, first means operatively interengaging said draw bar and said first slide to cause transverse movement of said first slide when said draw bar is shifted axially in one direction and second means interengaging said draw bar and said second slide to cause said second slide to move in an opposite direction transverse to said axis when said draw bar shifted axially in said body in said one direction.

10. The machine tool set forth in claim 9 wherein said first slide movement causing means comprises first key means interengaging said draw bar and said first slide, said second slide movement causing means comprises second key means interengaging said draw bar and said second slide and wherein said first and second key means are inclined in opposite directions to each other axially of said body.

11. The machine tool set forth in claim 9 wherein said first key means comprises a key integral with said draw bar and a key way on said first slide, said first slide comprises a pair of blocks having a flat parting interface therebetween extending parallel to said axis and wherein said key way comprises a first flat cam face on one of said slide blocks and a second flat cam face on the other block.

12. The machine tool set forth in claim 9 further comprising third cutting tool means carried on said body for movement transverse to said axis and wherein said draw bar is integrated with said third tool carrying means to move said third tool carrying means between radially extended and retracted positions.

13. The machine tool set forth in claim 9 further comprising means to compensate for wear at one of said cutting tools by varying one axial travel limit of said draw bar and wear of the other cutting tool by varying an opposite axial travel limit of said draw bar.

14. The machine tool set forth in claim 8 wherein one of said slides has a first travel to back bore a first diameter and wherein said first travel is greater than a maximum clearance between said body and a bore that it is machining.

15. The machine tool set forth in claim 7 comprising tool movement means operative to retract said first cutting tool as said body is inserted in a first direction axially through a bore to be machined, extend said second cutting tool as said body is moved in said first axial direction to bore a first diameter of said bore, maintain said body at a fixed axial position while extending said first tool and substantially simultaneously retracting said second tool away from said first diameter, said first and said second slide means being spaced apart axial of said body a distance correlated to axial dimensions of said first and said second diameters such that said first cutting tool is clear of said bore when said second tool completes boring said first diameter, said tool movement means moves said body in an opposite axial direction to back bore a second diameter and then retracts said second cutting tool to machine a radial face at an inner end of said second diameter and substantially simultaneously extends said first cutting tool at a location axially of said bore where it clears said first diameter.

16. The method of machining a bore in a differential carrier, said bore having a geometry requiring back boring of a first diameter and generating a radial face at an inner end of said first diameter and boring a second diameter spaced axially of said first diameter, said method comprising rotating a tool body coaxially with said bore, moving said tool body along said axis in a first axial direction to project a free end of said body through said bore while a first cutting tool on said body is radially retracted to clear said bore as said cutting tool is moved through said bore, radially moving a second cutting tool on said body to engage said bore and bore said second diameter while said first cutting tool is radially retracted, radially retracting said second insert at the completion of boring said second diameter while substantial simultaneously radially extending said first insert to a location to back bore said first diameter, axially retracting said body to back bore said first diameter and then radially retracting said first insert to generate a radial face on said bore while substantially simultaneously extending said second insert at a location axially of said carrier so that said second insert clears said second diameter, axially retracting said body from said bore with said first insert fully retracted so that said first insert clears said part as said body is retracted and correlating movement of said first and second inserts during extension and retraction thereof so that unbalance of said body that would be caused by radial movement of one of said inserts is offset by radial movement of the other insert.

17. The method set forth in claim 16 wherein radial movement of said inserts is correlated by extending and retracting said first and said second inserts at substantially the same location circumferentially of said body.

* * * * *